United States Patent [19]

Miura

[11] Patent Number: 5,062,006
[45] Date of Patent: Oct. 29, 1991

[54] SHEET FEEDING APPARATUS AND FACSIMILE SYSTEM HAVING SAME
[75] Inventor: Shigeo Miura, Tokyo, Japan
[73] Assignee: Canon Kabushiki Kaisha, Tokyo, Japan
[21] Appl. No.: 352,188
[22] Filed: May 15, 1989
[30] Foreign Application Priority Data
  May 17, 1988 [JP] Japan ................. 63-118269
[51] Int. Cl.⁵ .............................................. H04N 1/00
[52] U.S. Cl. .................................... 358/421; 358/410; 358/412
[58] Field of Search ............... 358/400, 410, 419, 420, 358/421, 422, 423, 496, 498, 488, 486, 412, 418

[56] References Cited
U.S. PATENT DOCUMENTS
3,622,695 11/1971 Rugaber ............................ 388/496
4,857,817 8/1989 Kugioka ............................ 318/696

Primary Examiner—Edward L. Coles, Sr.
Assistant Examiner—Jerome Grant, II
Attorney, Agent, or Firm—Fitzpatrick, Cella, Harper & Scinto

[57] ABSTRACT

The present invention relates to a facsimile system comprising a reader for reading an original sheet, a recorder for recording an image on a recording sheet, a stepping motor for feeding at least one of the sheets, a drive means for generating a signal by which the stepping motor is driven repeatedly with predetermined excitation modes, and a discrimination means for discriminating an excited phase of the stepping motor. The power down signal is generated when the discrimination means discriminates the fact that the excited phase of the stepping motor is a second phase.

5 Claims, 15 Drawing Sheets

SHEET FEEDING APPARATUS AND FACSIMILE SYSTEM HAVING SAME

BACKGROUND OF THE INVENTION

1. Field of the Invention

The present invention relates to a sheet feeding apparatus for feeding a sheet by driving a sheet feeding mechanism by means of a stepping motor, and a facsimile system having such sheet feeding apparatus.

2. Related Background Art

FIG. 1 shows a schematic construction of a facsimile system wherein a recording sheet 60 comprised of a heat-sensitive paper which is colored when heat is applied thereto is fed from a sheet roll 61 of a continuous long sheet material housed in a roll holder 62. An image is recorded on the recording sheet 60 in a recording portion 63, and the recorded sheet is cut from the remaining sheet 60 by means of a cutter 64 and then is ejected or discharged by ejecting rollers 65 out of the system. Further, in an original reading portion 66, original sheets stacked on an upper cover are separated one by one by means of separating rollers 6a, and the separated original is moved at a constant speed by means of a feed roller 6b. Meanwhile, a light source 6c illuminates the original, and the reflected light from the original is sent to a photoelectric converter element 6f through a mirror 6d and a lens 6e, so that the original information is converted to an electric signal which is to be sent to the predetermined recording portion 63 or a memory (not shown).

Now, a recording operation performed in the recording portion 63 will be explained. The recording portion 63 includes a line-type recording head which comprises a plurality of heating elements selectively heated in response to an image signal and which is urged, by means of a bias spring 69, against a platen roller 67 acting as feeding means for the recording sheet 60. By rotating the platen 67 in a direction shown by an arrow a through a movement transmission system (not shown) by means of a motor 69, the recording sheet 60 is fed, and the image is thermally recorded on the recording sheet 60 by heating the recording head 68 in response to the image signal.

On the other hand, a side wall 70 which separates or partitions the roll holder 62 from the recording portion 63 is designed to have a height of about ½ of a maximum permissible diameter of the sheet roll, and a space 71 is provided between the side wall 70 and the platen roller 67. The space 71 serves to create a gentle slack in the leading portion of the recording sheet 60 when the leading edge of the recording sheet 60 is returned from a cutting position of the cutter 64 to a position where the leading edge of the sheet is pinched or nipped between the platen roller 67 and the recording head 68. To this end, the space 71 has a width (between the sheet roll and the platen roller) to an extent that the recording sheet 60 is not bent at an acute angle when the sheet is slackened. Incidentally, the recording sheet 60 is guided toward the recording portion 63 by means of a guide member 72.

A recent facsimile system has transmission-reception function through memory means of large capacity, and includes multiple address function, repeater function, confidential function or the like to improve the operability and efficiency thereof. To achieve this, techniques regarding the high speed reading of the original and/or the high speed recording have been required, and, particularly, a method for driving motors such as a motor for feeding the original and a motor for feeding the recording sheet have been called to account.

Now, FIG. 2 shows, in a conventional facsimile system, a damping amount of a four phase unipolar stepping motor for rotatingly driving the platen roller 67 in the recording portion 63 or the feed roller 6b in the original reading portion 66, during first phase excitation and second phase excitation thereof, when such stepping motor is driven at a low speed with 1-2 phase excitation. FIG. 3 shows a displacement amount of the feed roller 6b, when the stepping motor of FIG. 2 is driven at a low speed with 1-2 phase excitation.

As seen in FIG. 2, in this stepping motor, the damping occurs when the first excitation is changed to the second excitation by trigger. Consequently, the movement of the feed roller 6b becomes non-uniform or uneven, as shown in FIG. 3, and, thus the original will be fed unevenly due to the trigger. Further, since the feed roller 6b rotates only in one direction, when a considerable backlash occurs in the motor as shown in FIG. 2, a maximum displacement ("P" in FIGS. 2 and 3) of the motor in a positive direction (upward direction in FIGS. 2 and 3) leads to the rotational amount of the feed roller 6b in FIG. 3 just as it is, thus resulting in the error of reading in the positive direction.

FIG. 4 shows a displacement amount of the platen roller 67 when it is driven at a low speed with 1-2 phase excitation in the case where the stepping motor having the feature shown in FIG. 2 is adopted to the driving mechanism for driving the platen roller 67 in the recording portion 63, and FIG. 5 shows an example of an image reproduced or recorded when the wholly black image signal is transmitted or received in the above-mentioned condition.

As apparent from FIG. 5, while a wholly black image signal is transmitted or received, the recorded image will nevertheless include white stripes due to the uneven feeding of the original and recording sheet for the above-mentioned reasons.

FIG. 6A shows current values of phase A and phase B in each quadrant when the stepping motor is driven with micro-steps, FIG. 6B shows a phase A current value, and FIG. 6C shows a phase B current value. FIGS. 7 and 8 show an example of a construction of PM-type stepping motor. The stepping motor includes a stator 80 and a rotor 81 which is spaced apart from the stator by a distance 1. FIG. 7 shows a condition that the motor is stopped in a second phase (A, BX=N, AX, B=S) and FIG. 8 shows a condition that the rotor is stopped in a first phase (A=N, AX, B, BX=S). Here, S and N are polarities of a magnetic pole.

As mentioned regarding the above conventional facsimile system, a holding torque of the stepping motor when it is driven with first phase excitation differs from that when driven with second phase excitation. That is to say, when the stepping motor is driven with the second phase excitation, the rotor is shifted with strong force, whereas, when the stepping motor is driven with the first phase excitation, the rotor is shifted with weak force. Consequently, the vibration of the stepping motor is increased, generating the uneven rotation of the motor, thus forming the white stripes in the recorded image as shown in FIG. 5. This phenomenon will be emphasized when the stepping motor is rotated at a low speed i.e., in a high quality image mode (fine mode).

In order to solve such problem, a technique wherein a sheet feed for single scanning line is effected through two steps of the stepping motor has been proposed, for example, as disclosed in the Japanese Patent Publication No. 62-37866. According to this conventional technique, since sub-scanning drive is effected on the basis of a unit which corresponds to the sum of the moved distance of the rotor when the stepping motor is driven with the first phase excitation and the moved distance of the rotor when the stepping motor is driven with the second phase excitation, dispersion in distances between the scanning lines can be eliminated.

However, in the fine mode of a facsimile system, since delicate control is required, it is necessary to perform the sheet feed for a single scanning line through a single step of the stepping motor. In such a case, there will arise a problem wherein the holding torque of the stepping motor, when it is driven with first phase excitation, differs from that when driven with second phase excitation.

Further, in order to solve the above-mentioned problem, there has been proposed a micro-step drive technique that, when the sum of the current vectors exists on a circle as shown in FIG. 6A, necessary micro-steps are sought by decomposing the full-step (when the electric phase angle is 90°), and a single step of the stepping motor is decomposed into a given number of micro-steps. According to this drive technique, the vibration of the stepping motor can be reduced, whereby the original and the recording sheet can be uniformly fed. However, since D/A converters, special control circuits and the like are required to realize this technique, the system was expensive and was large-sized.

Further, as shown in FIGS. 7 and 8, since the holding torque is proportional to the total value of the exciting currents flowing in the stator of the stepping motor, when it is assumed that the current flow in the first phase excitation is "1", the current flow in the second phase excitation will be $\sqrt{2}$ ($=1/\sqrt{2}+1/\sqrt{2}$). Consequently, the holding torque was increased accordingly, with the result that the vibration of and the uneven rotation of the stepping motor was not effectively eliminated even by the above-mentioned drive technique.

In order to solve this problem, a technique that the motor currents in the first and second phase excitations for a stepping motor are controlled to reduce or eliminate the difference between the torque generated in the first phase excitation and the torque generated in the second phase excitation has been proposed, for example, in the U.S. Pat. No. 4,642,544 or in the U.S. Ser. No. 148,690, now U.S. Pat. No. 4,857,817. In both cases, however, such proposal relates to the stepping motor alone and does not relate to the sheet feeding apparatus or the facsimile system at all. In addition, the latter proposes a technique that the current is changed by a resistor and the former proposes a technique that the current is controlled by controlling the duty of pulses; thus, these techniques made the construction complicated.

Furthermore, in the conventional facsimile systems, there was a further problem that, since the cutter for cutting the recorded sheet was normally driven by the stepping motor, noise was generated during the cutting operation of the recording sheet.

SUMMARY OF THE INVENTION

It is an object of the present invention to eliminate the above drawbacks, i.e., to perform the reading of the original and the reproduction of the original image with high quality by suppressing fluctuation of the holding torque generated in the phase excitation by altering or changing the winding current per one phase according to an excited condition of each phase.

Other objects of the present invention will be apparent from the following explanation regarding embodiments of the present invention.

DESCRIPTION OF THE PREFERRED EMBODIMENTS

The present invention will now be explained in connection with a preferred embodiment thereof with reference to the accompanying drawings.

Figure 1:
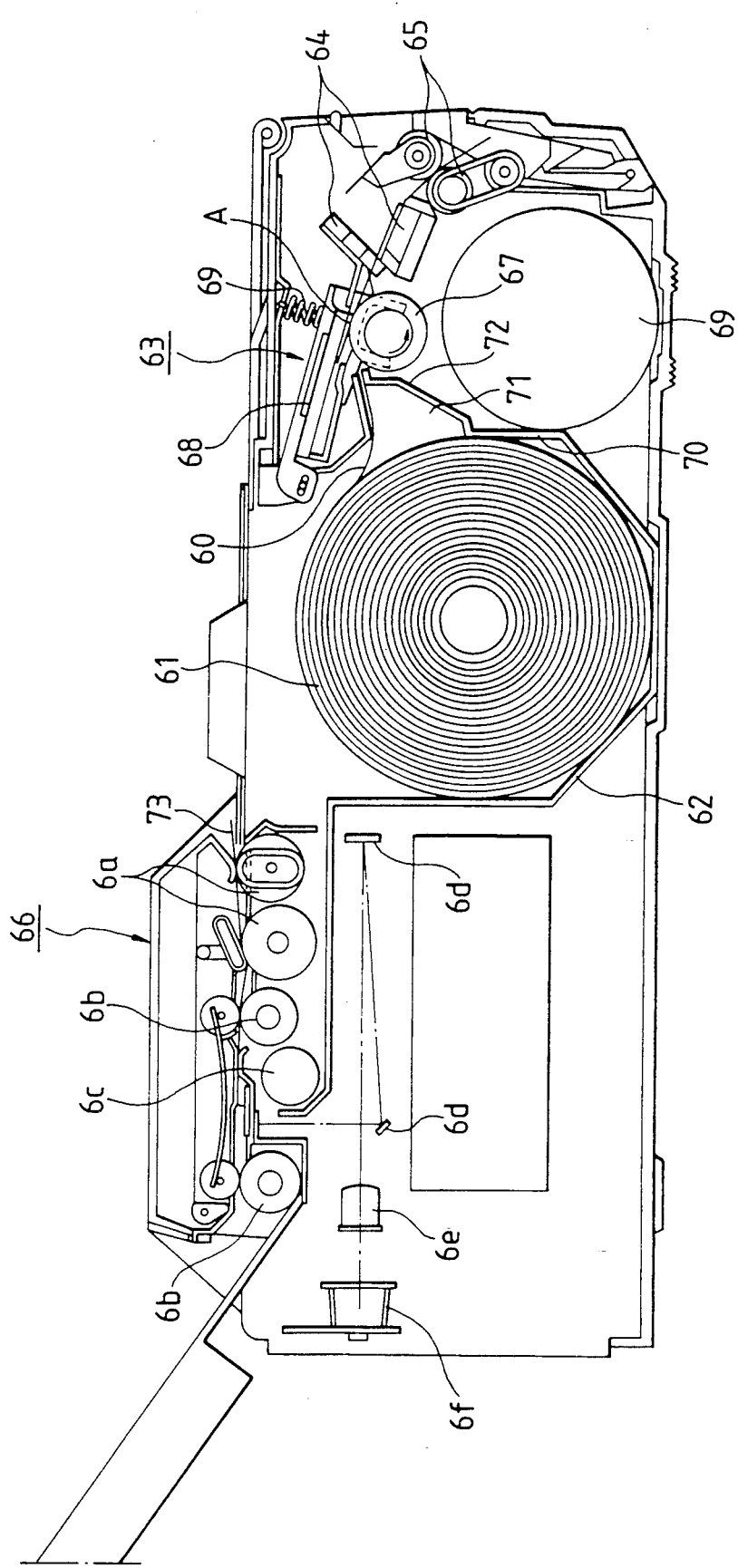
FIG. 1 is an elevational sectional view of a facsimile system showing a construction thereof.
Figure 2:
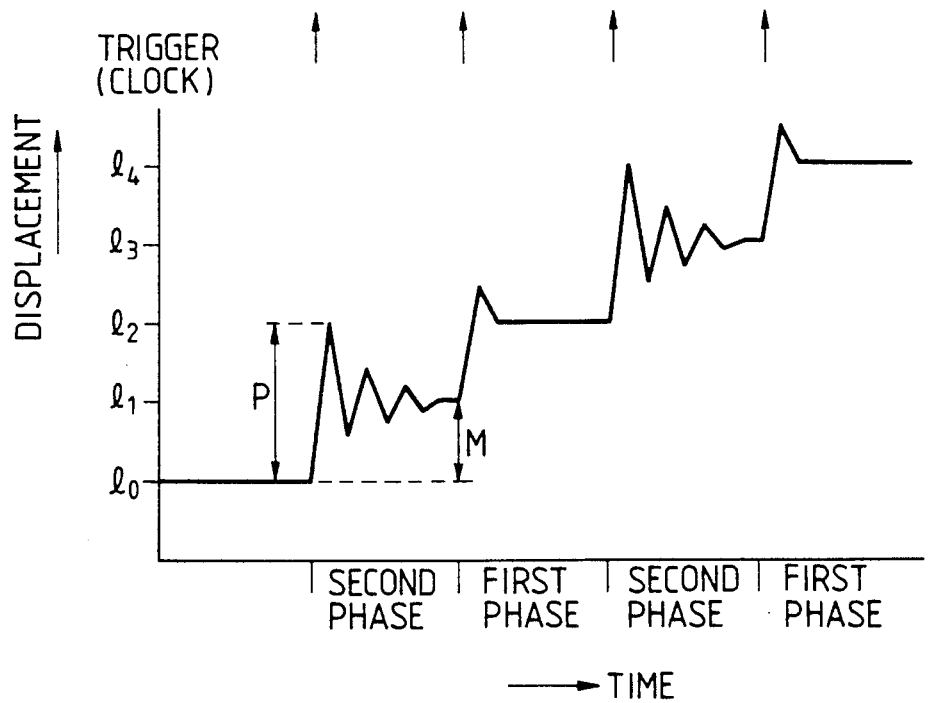
FIG. 2 is a graph showing a damping amount in a conventional motor control.
Figure 3:
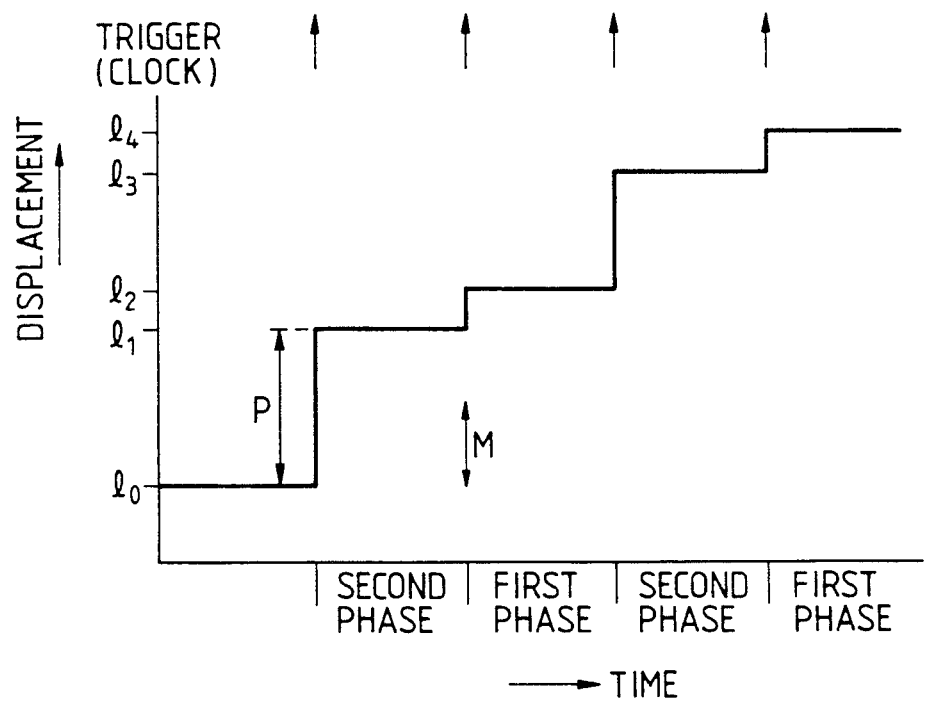
FIG. 3 is a graph showing a displacement amount of a feed roller in a conventional motor control.
Figure 4:
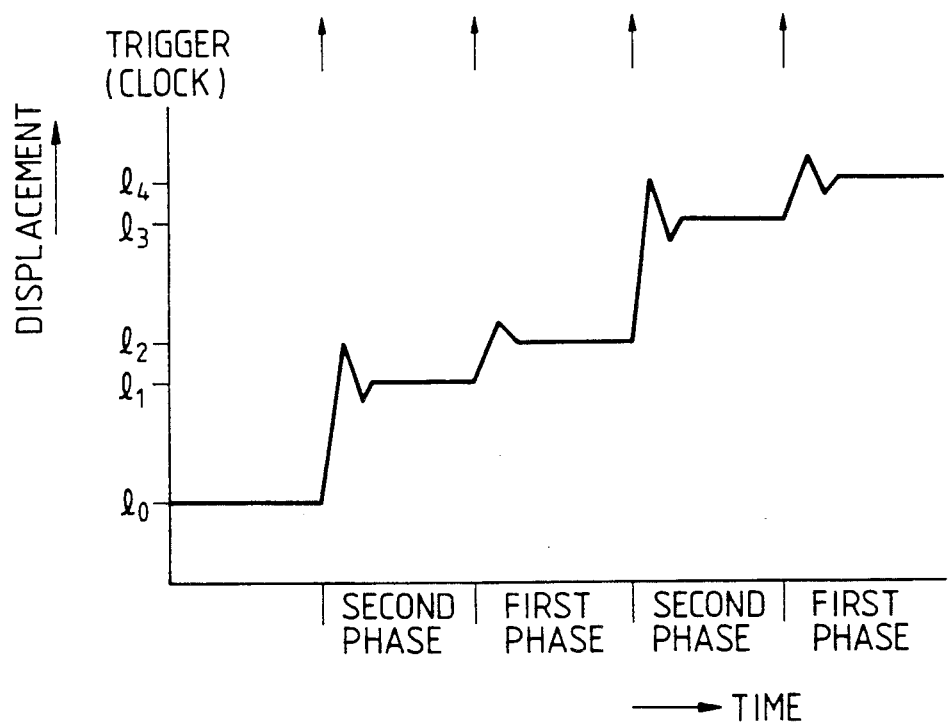
FIG. 4 is a graph showing a displacement amount of a platen roller in a conventional motor control.
Figure 5:
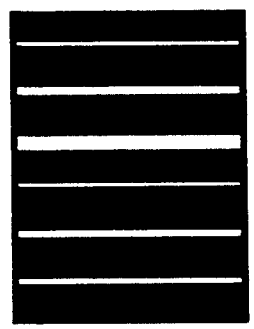
FIG. 5 shows an example of a wholly black image reproduced by a conventional facsimile system.
Figure 6A:
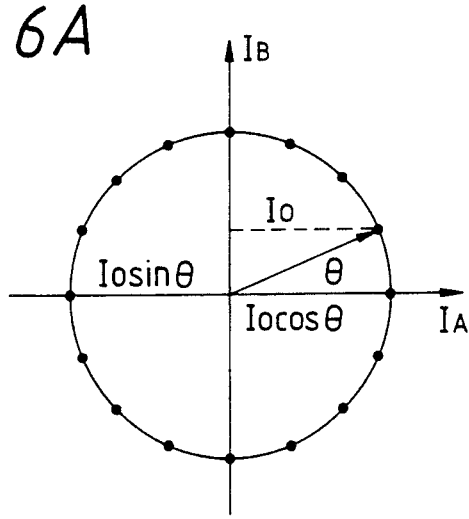
FIGS. 6A to 6C show conditions of a winding current of a stopping motor driven with micro-steps.
Figure 6B:
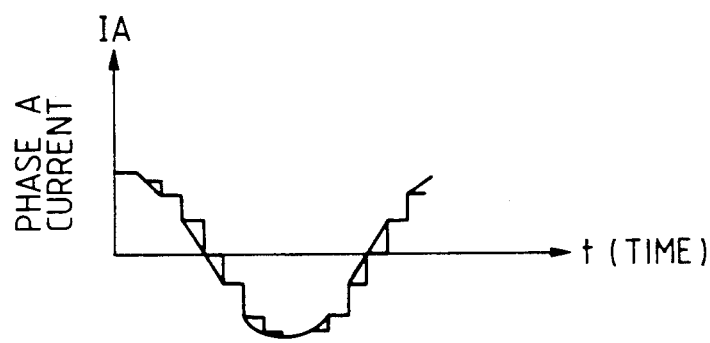
Figure 6C:
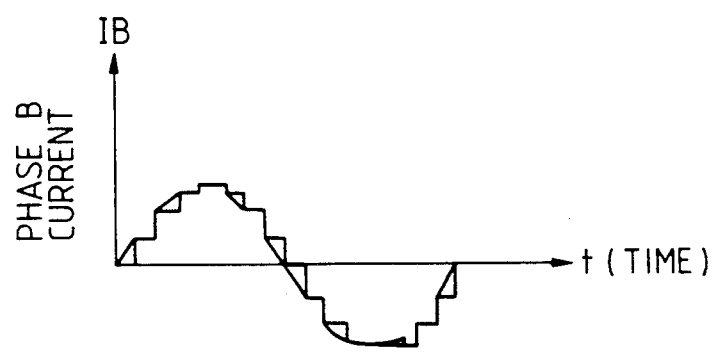
Figure 7:
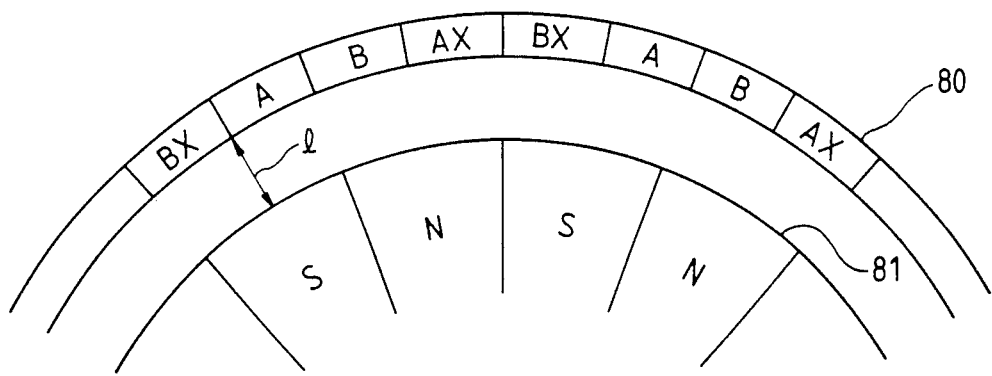
FIG. 7 shows a portion of the stepping motor which is stopped in second phase excitation.
Figure 8:
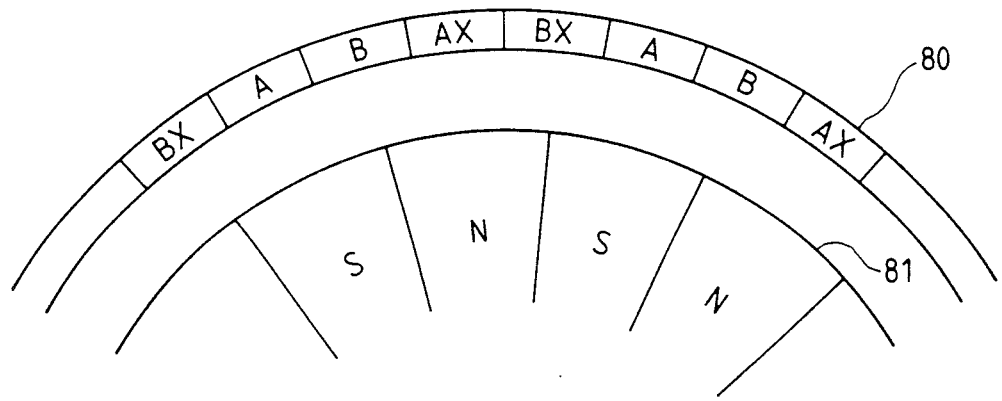
FIG. 8 shows a portion of the stepping motor which is stopped in first phase excitation.
Figure 9:
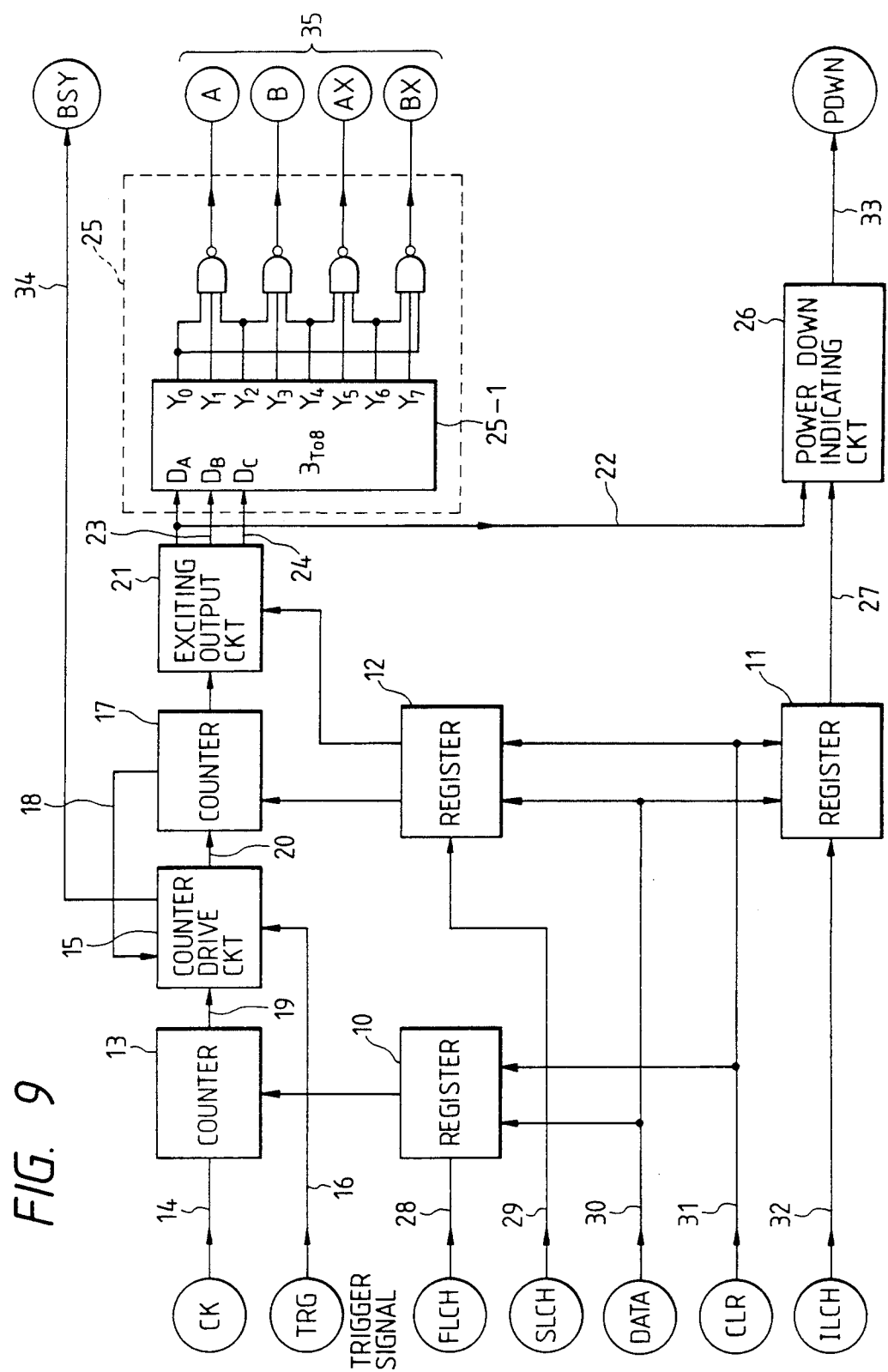
FIG. 9 is a block diagram showing a schematic construction of a motor control circuit according to an embodiment of the present invention.

FIG. 9 shows a schematic construction of a motor controlling portion in a sheet feeding apparatus according to the present invention.

The motor controlling portion comprises a register 10 for storing a frequency dividing ratio in a counter 13, a register 11 for storing data of the presence of current control and presence of power down (i.e., normal mode or power down mode) of a driving current of a motor, and a register 12 for storing an exciting output, rotation direction and serial driving stepping number per one trigger, regarding the motor. The counter 13 executes the frequency dividing of the inputted block signal 14 as indicated by the register 10, and the frequency divided clock signal acts as a driving clock signal for the motor. A counter driver 15 controls the driving of a counter 17 and receives a frequency dividing clock signal 19 from the counter, a trigger signal 16 and a busy signal 18 from the counter 17. If the counter driver circuit 15 receives the trigger signal 16 when the counter 17 is not being driven, it outputs a trigger signal 20 to the counter 17. The counter 17 begins to operate when it receives the trigger signal 20, and sends, to an exciting output circuit 21, pulses by the stepping number indicated by the register 12.

The exciting output circuit 21 outputs exciting signals 22~24 on the basis of conditions of the register 12 and of the counter 17, thereby driving a motor driving circuit 25. The motor driving circuit 25 receives the exciting signals 22~24. The received exciting signals are decoded by a decoder 25-1 and are output from the circuit 25 as four phase motor exciting signals A, B, AX and BX. A power down indicating circuit 26 outputs a power down signal 33 when an indicating signal 27 from the register 11 indicates the presence of the current control and the motor current is set to the normal mode.

The trigger signal 16 instructs the initiation of operation of the motor. The reference numeral 28 designates a latch signal for latching data 30 representing the frequency dividing ratio in the register 10, 29 designates a latch signal for latching data 30 representing the serial driving stepping number and rotation direction of the motor in the register 12, 31 designates a clear signal for clearing the registers 10~12, and 32 designates a latch signal for latching information such as the power down mode and the like in the register 11. These signals are outputted from a CPU 411 shown in FIG. 12.

The power down signal 33 is outputted when the motor is to be driven in the power down mode (where the current values of the windings of the motor is decreased by 50% or more, or less of those in the normal mode). The reference numeral 34 designates a busy signal showing a condition that the motor is being rotated.

Figure 10:
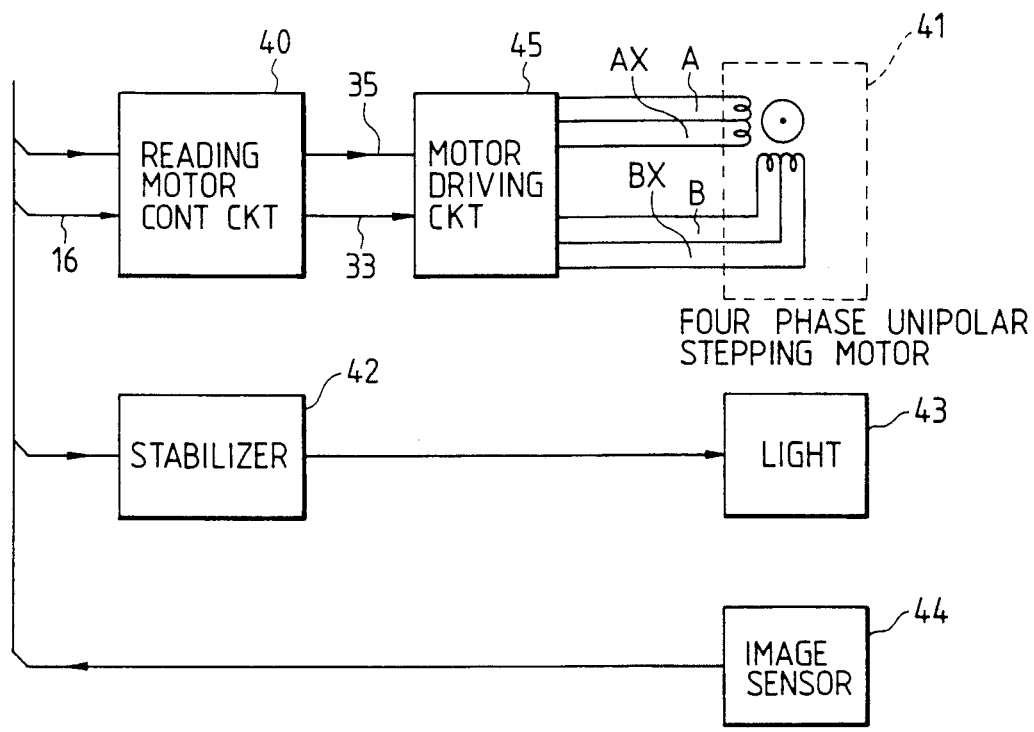
FIG. 10 is a block diagram showing a schematic construction of a reading portion of a facsimile system having the motor control circuit of FIG. 9.

FIG. 10 is a block diagram showing a schematic construction of a reading portion or reader 404 (FIG. 12) in the facsimile system.

The reader comprises a reading motor control circuit 40 including the circuits and the like shown in FIG. 9, a four phase unipolar stepping motor for feeding an original to be read, and a motor driving circuit 45 which receives an exciting signal 35 for each phase and other various signals from the reading motor control circuit 40 and drives the stepping motor with chopper drive. The motor driving circuit 45 can also drive the stepping motor with the current value (flowing in the windings of the stepping motor 41) of, for example, ½ of the current value in the normal mode. The reader further includes a stabilizer 42 for suppressing variation of luminance of a light 43 illuminating the original to stabilize the luminance of the light 43, and an image sensor 44 for reading the original image and for photoelectrically converting it.

Figure 11:
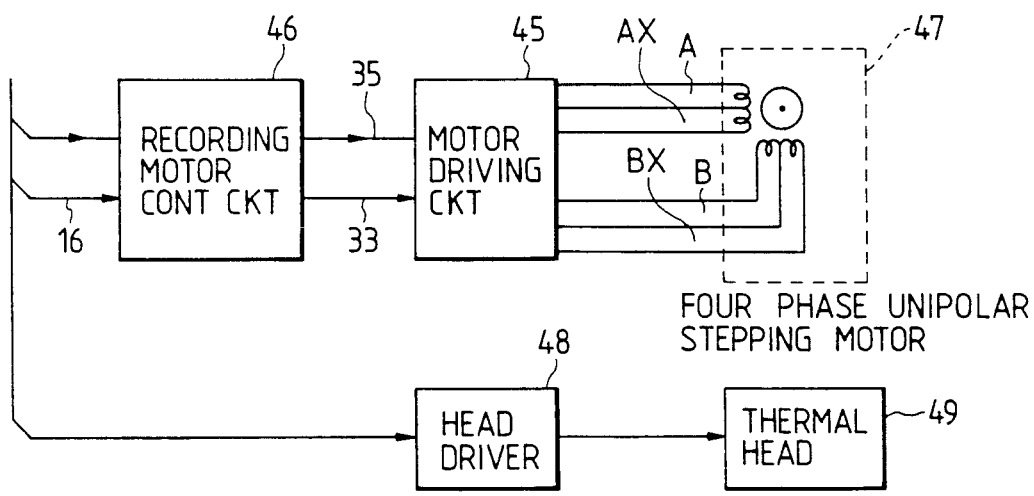
FIG. 11 is a block diagram showing a schematic construction of a recording portion of the facsimile system having the motor control circuit of FIG. 9.

FIG. 11 is a block diagram showing a schematic construction of a recording portion or recorder 405 (FIG. 12) for recording the image on the recording sheet. The recorder comprises a recording motor control circuit 46 which controls the operation of a motor 47 for feeding the recording sheet and which has similar elements shown in FIG. 9, a motor driving circuit 45 having the same construction of the motor driving circuit of FIG. 10, a four phase unipolar stepping motor 47 for feeding the recording sheet, a thermal head 49 comprising a thermal line head for recording the image on the recording sheet on the basis of image information, and a head driver 48 for driving the thermal head 49.

Figure 12:
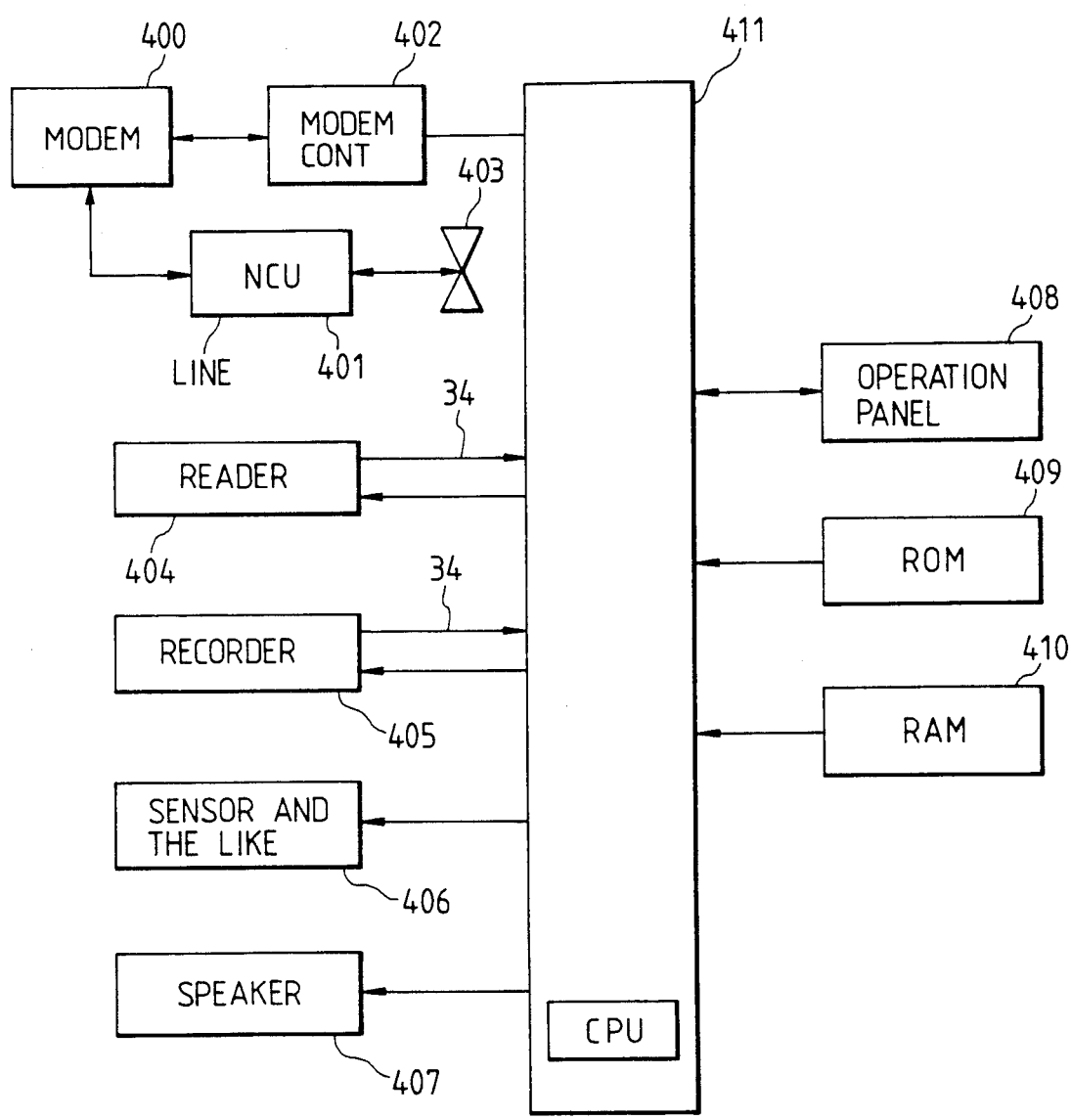
FIG. 12 is a block diagram showing a schematic construction of the facsimile system.

FIG. 12 is a block diagram showing a schematic construction of a facsimile system according to an embodiment of the present invention.

The facsimile system comprises a modem 400, a line control unit (NCU) 401, a modem control circuit 402 for controlling the modem 400, a telephone 403, the reader 404 shown in FIG. 10, the recorder 405 shown in FIG. 11, sensor and the like 406 for detecting the presence of the recording sheet and of the original, a width of the recording sheet and the like, a speaker 407 for generating an error sound, monitor sound of the line and the like, an operation panel 408 including operation keys, displayers and the like, a ROM 409 for storing a control program of the CPU 411 and various data, a RAM 410 which is used as a work area of the CPU 411 and which can temporarily store the original image data, received image data and the like, and the above-mentioned CPU 411 including, for example, a microcomputer, various control circuits and the like for controlling the whole system.

Figure 13:
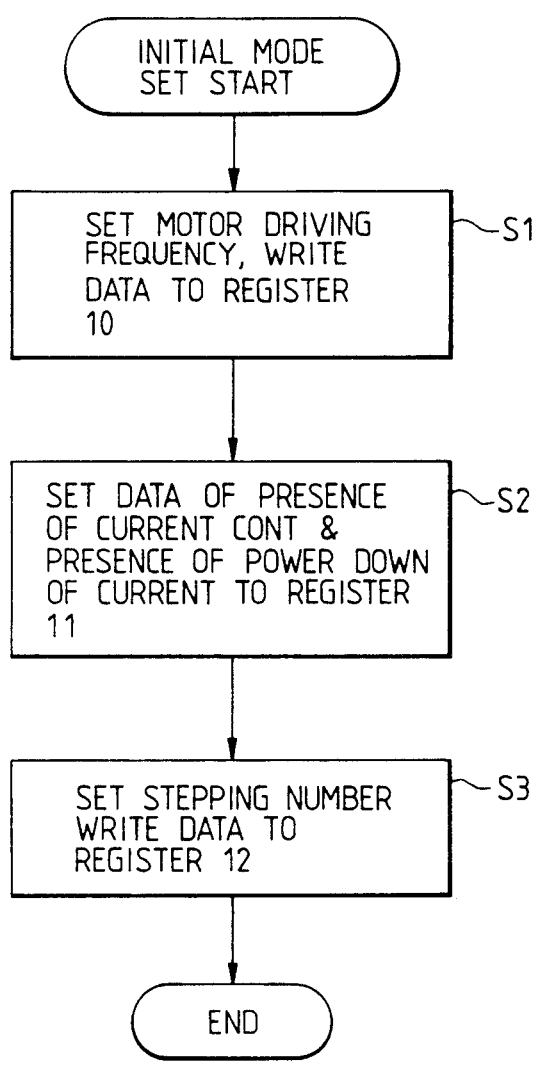
FIG. 13 is a flow chart showing a process for setting an initial mode regarding the motor control circuit of FIG. 9.

FIG. 13 is a flow chart showing an initial setting process for the motor control circuit 40 or 46 shown in FIG. 9 or FIG. 10. A program for executing this process is stored in the ROM 409.

In FIG. 13, first of all, the data for setting the motor driving frequency is written in the register 10 in a step S1. In this way, the frequency dividing ratio of the clock signal 14 effected in the counter 13 is determined. Next, in a step S2, information regarding the presence of the current control, the presence of the power down of the driving current of the motor and the like are set in the register 11. In step S3, the information regarding the stepping number of the motor enable or disenable of the exciting output, normal or reverse of the rotation direction of the motor are set in the register 12. Incidentally, the latchings or settings of the various data in these registers can be effected by outputting the data corresponding to the data bath 30 and by latching the data in the desired registers by means of the corresponding latch signal.

Figure 14:
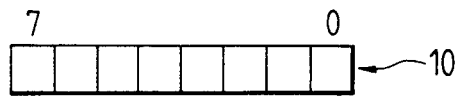
FIGS. 14 to 16 show data constructions of respective registers in the motor control circuit of FIG. 9.

FIG. 14 shows a data construction of the register 10, where the information for setting or determining the motor driving frequency (frequency dividing ratio) is stored.

Figure 15:
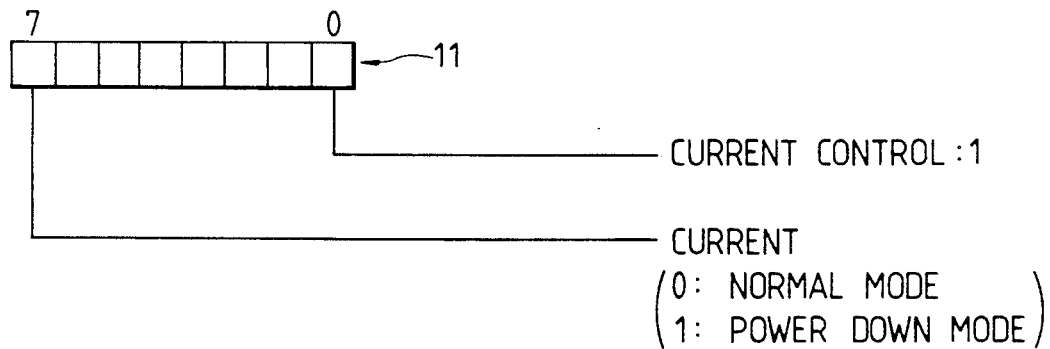

FIG. 15 shows a data construction of the register 11, which indicates that, when MSB is "0", the current of the motor flows in the normal mode and, when the MSB is "1", the current of the motor flows in the power down mode, and that, when LSB is "1", the current control is indicated or instructed.

Figure 16:
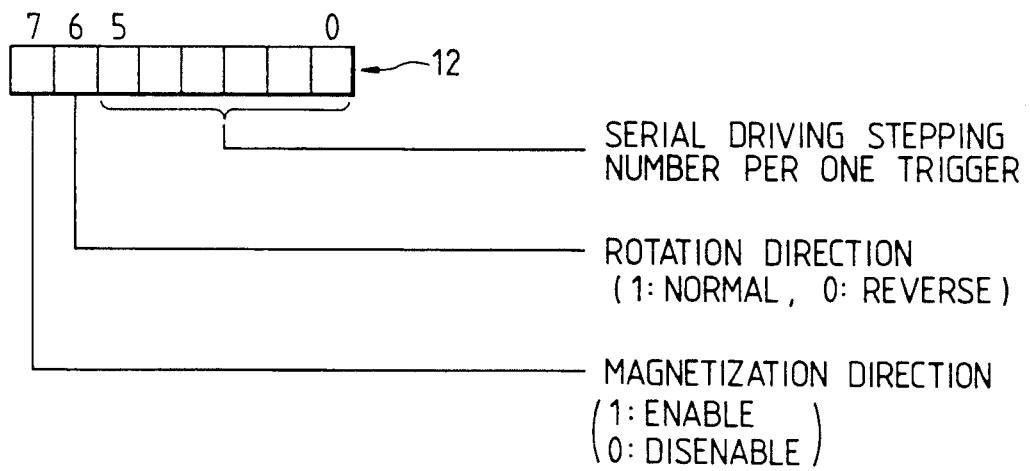

FIG. 16 shows a data construction of the register 12, which indicates that, when the MSB is "1", the exciting output is enable and, when the MSB is "0", the exciting output is disenable and that, when a sixth bit is "1", the rotation direction of the motor is normal and, and the sixth bit is "0" the rotation direction of the motor is reverse. Bits 0~5 indicate the stepping number of the motor serially rotated by a single trigger output.

Figure 17:
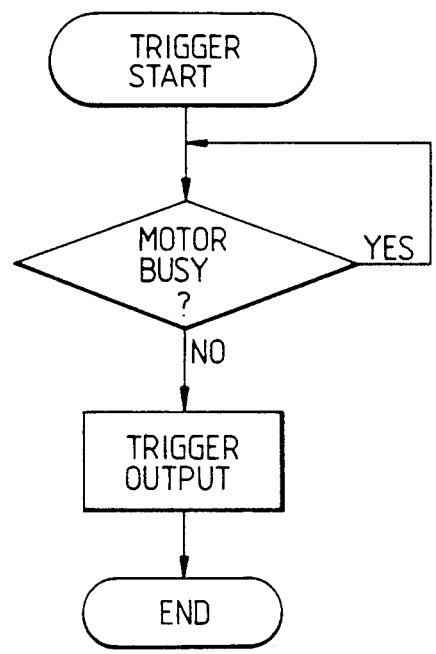
FIG. 17 is a flow chart showing a trigger output process regarding the motor control circuit of FIG. 9.

FIG. 17 is a flow chart showing outputting operation of the trigger signal 16 outputted to the respective motor control circuits of the reader 404 and the recorder 405 of the CPU 411. In this example, the busy signal 34 from each motor control circuit is inputted, and the motor driving trigger signal 16 is outputted when the corresponding motor is not driven.

Figure 18:
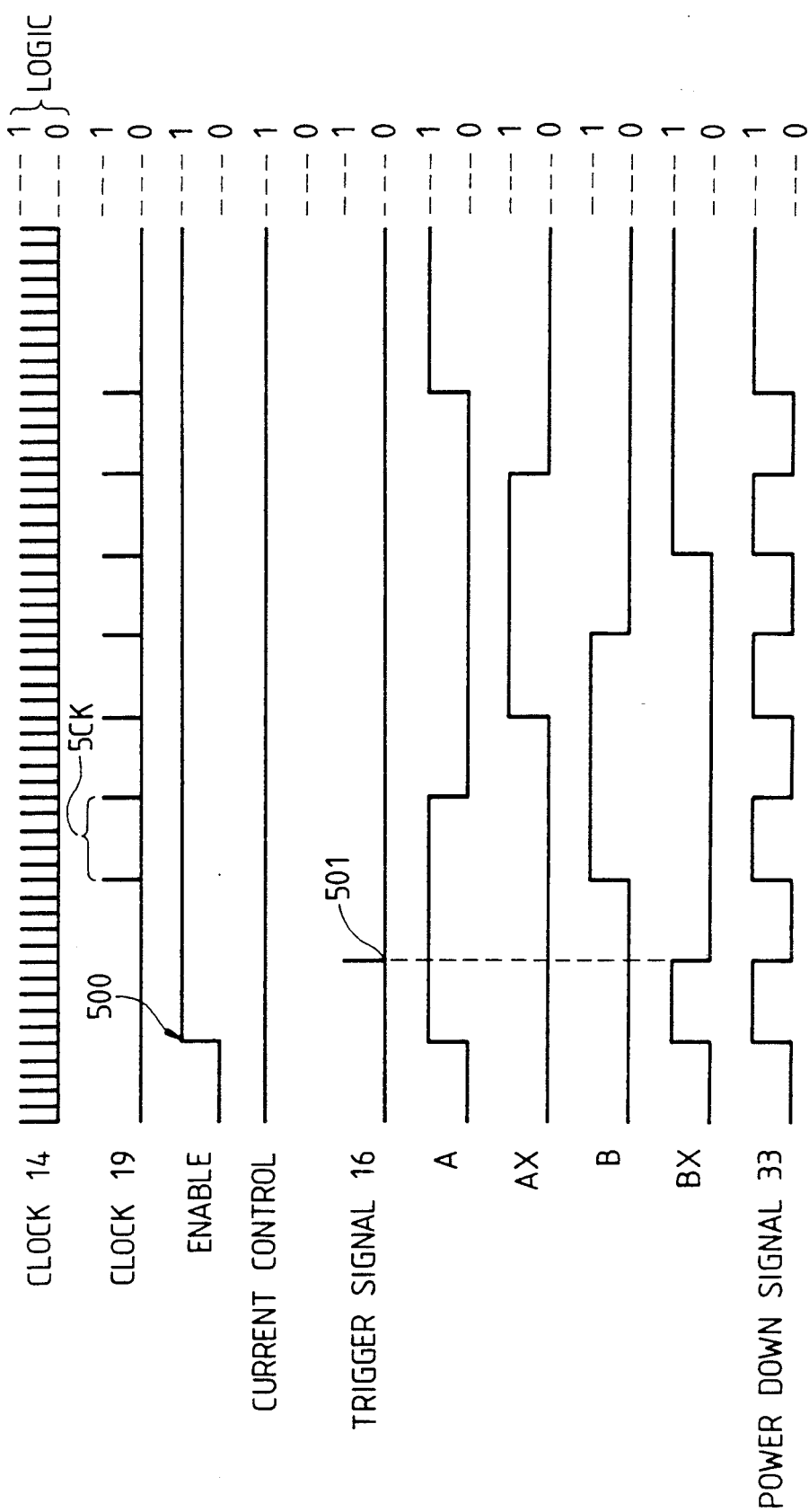
FIG. 18 is a timing chart showing an operation of the motor control circuit of FIG. 9.

FIG. 18 is a timing chart showing an example of the current control in the motor control circuit 40 or 46 of the facsimile system according to the embodiment of the present invention. In this example, the register 10 is set to "5", the register 11 is set to "1" and the register 12 is set to "C7H" (H shows a six-decimal number).

The clock signal 19 is a signal obtained by frequency-dividing the clock signal 14 into five by means of the counter 13 in correspondence to the value "5" of the register 10. The reference numeral 500 designates a condition that the excitation becomes enable by setting the value "C7H" in the register 12. Since the LSB of the register 11 is "1", the current control is in a high level ("1").

The reference numeral 501 shows an inputted timing of the trigger signal 16, from where the motor drive is started. A, AX, B and BX show exciting signals of the four phase motor. In this case, when the motor is excited with two phases, i.e., when either of A and AX phase signals and either of B and BX phase signals are simultaneously in the high level, the power down signal 33 becomes the high level, thus reducing the value of the current flowing the windings of the motor to about ½. In this way, in both the first phase excitation and second phase excitation, the values of the current flowing the windings of the motor will be substantially the same.

This power down signal 33 is output from the aforementioned power down indicating circuit 26, which circuit receives a value LSB (DA) of the inputting signal of the decoders 25-1 and controls to output the power down signal 33 when this value is "1" (high level).

Figure 19:
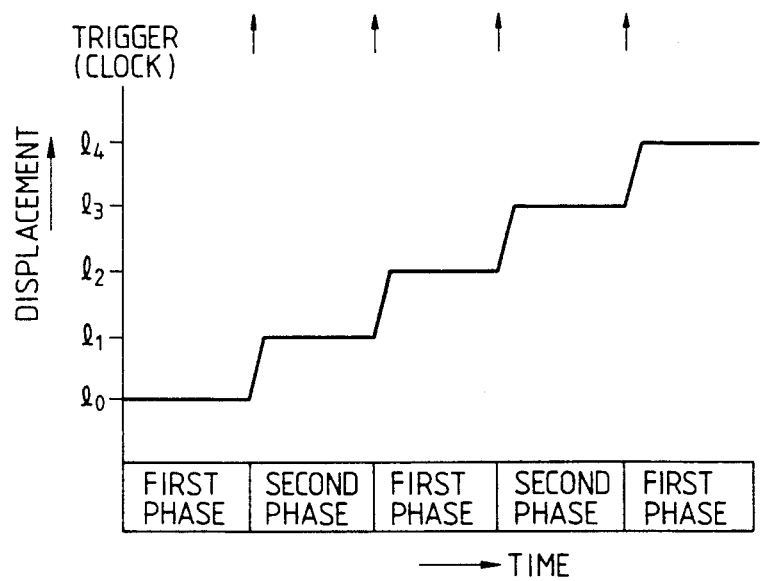
FIG. 19 is a graph showing a displacement amount of the motor in the respective phase excitations effected by the motor control circuit of FIG. 9.

FIG. 19 shows a relation between the excitation condition of the motor and the displacement amount of the motor corresponding thereto, when the above current control is executed. As seen in FIG. 19, the motor is driven to have the same displacement amounts in both first and second phase excitations.

Figure 20:
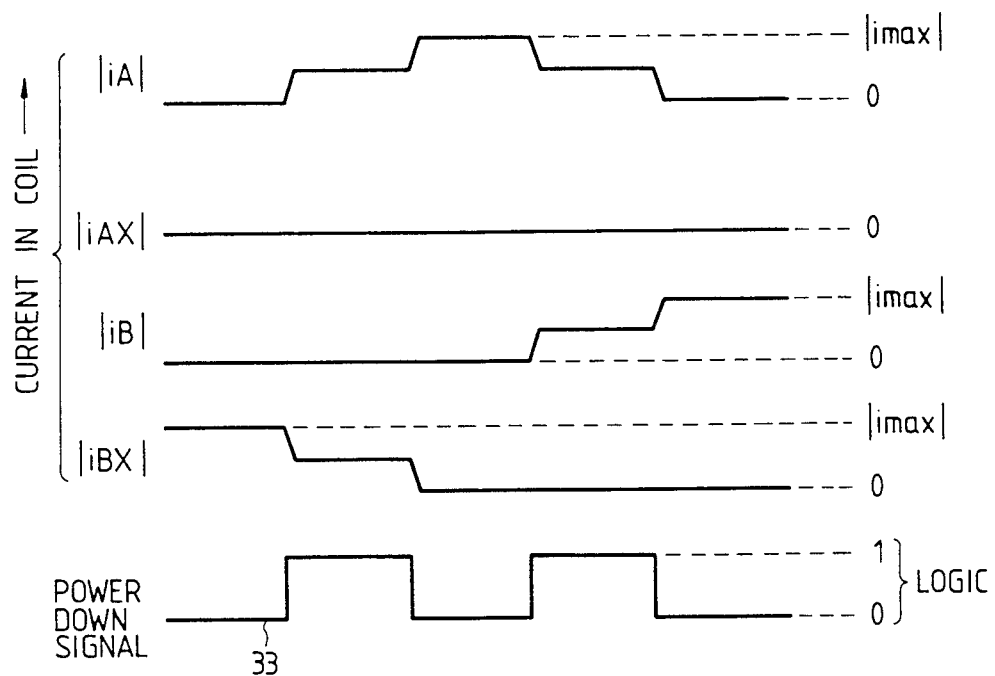
FIG. 20 is a timing chart showing current values of the respective windings of the motor control circuit of FIG. 9.
Figure 21A:
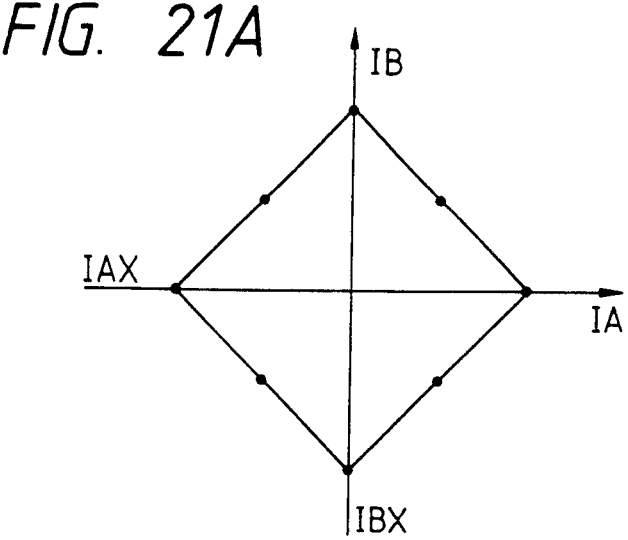
FIGS. 21A to 21C show motor driving currents of the respective windings of the motor control circuit of FIG. 9.
Figure 21B:
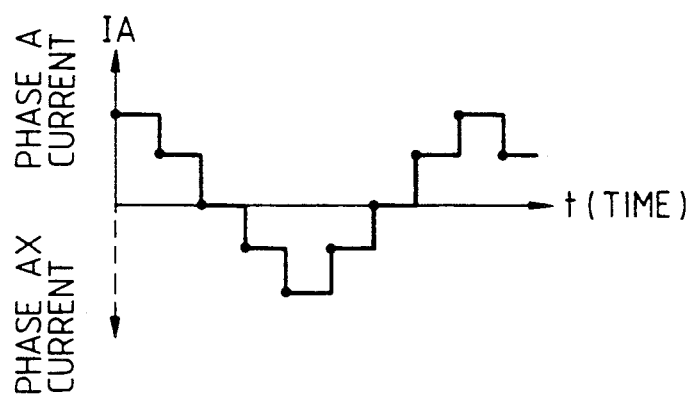
Figure 21C:
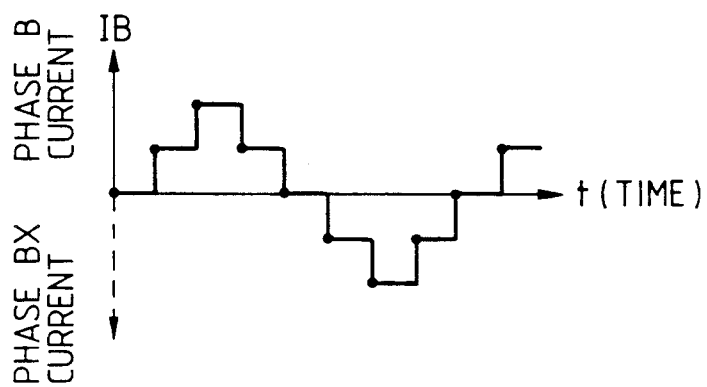

FIG. 20 is a timing chart showing the current values flowing in the windings of the motor, where iA, iAX, iB and iBX show the current value flowing the respective windings. In this way, by reducing the current values flowing the respective windings in the second phase excitation by about ½, the phase current flows along a square as shown in FIG. 21A, thus keeping the total current value to substantially constant.

Figure 22:
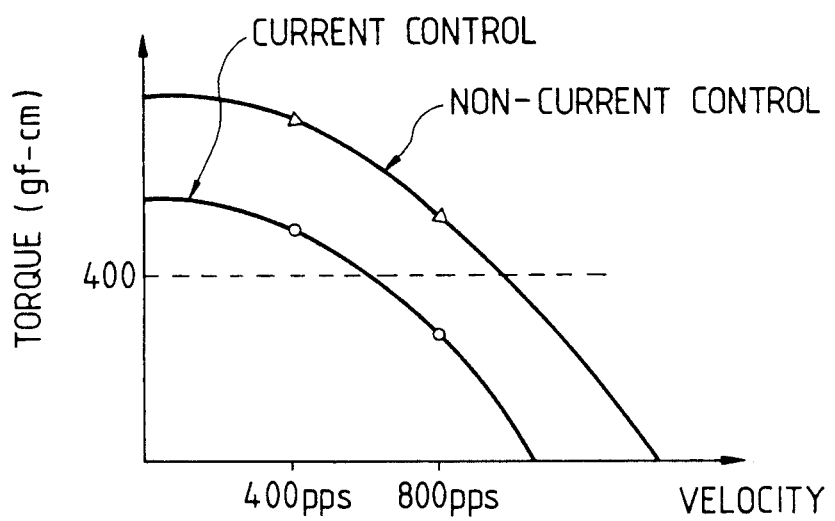
FIG. 22 is a graph showing a relation between a motor torque and a motor speed under current control and non-current control.
Figure 23:
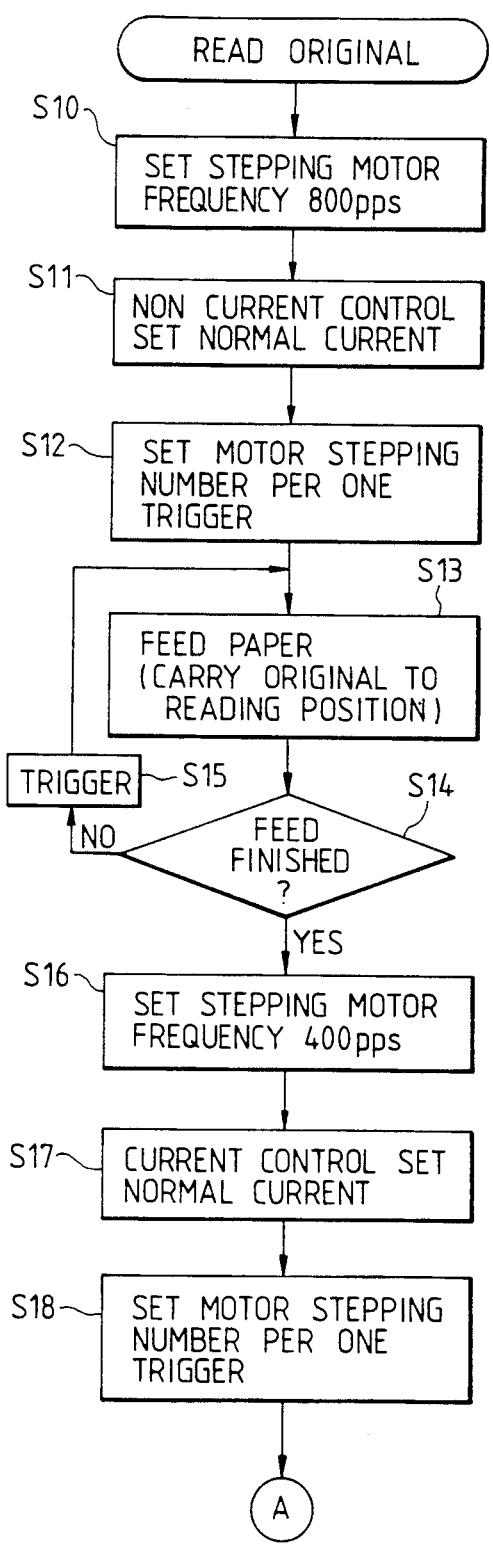
FIG. 23 is a flow chart showing manuscript feed control according to another embodiment of the present invention.
Figure 23:
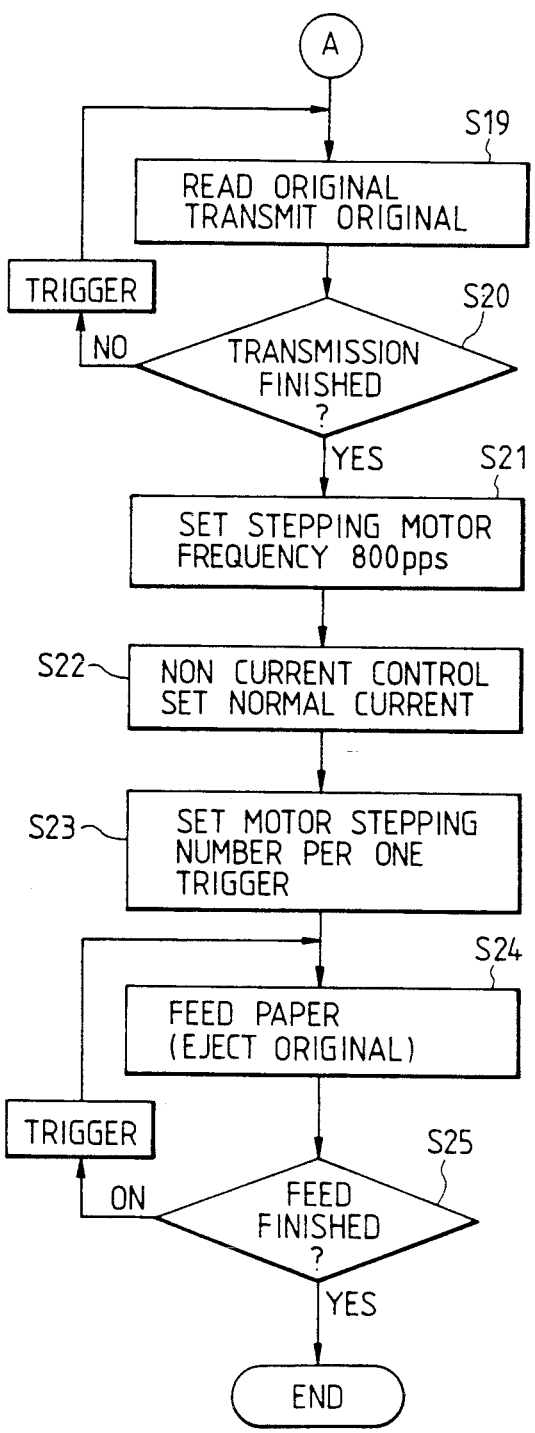

FIG. 22 shows a relation between the torque and the speed of the stepping motor, and FIG. 23 shows a flow chart for a motor controlling process in the original reading operation in a facsimile system according to another embodiment of the present invention.

In general, a stepping motor used as the aforementioned reading motor has a pull-in torque which decreases as the driving frequency thereof increases. A ratio of such reduction in the pull-in torque when the current flowing the windings of the stepping motor is controlled differs from that when the current is controlled. More particularly, the torque when the current is controlled will more decrease than that when the current control is not effected.

Thus, the case where the above-mentioned current control is executed to rotate the motor at a high speed will now be considered.

Now, if it is assumed that the pull-in torque of the order of 400 gf·cm is required in the normal mode. In this case, when it is desired that the motor having the feature shown in FIG. 22 is rotated at 800 pps, there arises a problem that the motor can be rotated if the above-mentioned current control is not executed, but cannot be rotated if the current control is executed.

Generally, in a facsimile system, when the original image to be transmitted is read, the motor is being rotated at a low speed in consideration of the sensitivity of the photoelectric converter element (image sensor), the transmitting speed and the like. On the other hand, for the purposes other than such reading operation of the original and the photoelectric converting operation, such as for the purpose of ejecting the transmitted original the motor is rotated at a higher speed to shorten the working time.

The original reading control sequence shown in the flow chart of FIG. 23 can meet with such requirements.

More particularly, in a step S10, the rotation speed of the original feeding motor is set to 800 pps, and in a step S11 non-current control mode is set. Then, in steps S12~S15, the original is fed to the reading position at a speed of 800 pps, and in a step S16 the rotation speed of the motor is decreased to 400 pps immediately before the reading of the original is initiated. Then, in a step S17, the current control mode is set, thus performing the reading operation of the original to be transmitted, while executing above-mentioned current control at a low speed (steps S18~S20).

In a step S21, the rotation speed of the motor is returned to 800 pps again when the reading operation of the original is completed, and in a step S22 the current control is inhibited, thus ejecting the original at a higher speed (steps S23~S25).

Incidentally, this sequence can be applied to the recording sheet feeding motor in the recoder in the same manner. In this case, the motor can be rotated at a low speed while exciting the current control, for example when the image is being recorded on the recording sheet through the thermal head, and can be rotated at a higher speed without the current control to feed the recording sheet at a high speed, when the recording sheet is fed to the recording position and/or when the recorded sheet is ejected.

In the above embodiment, an example of the PM-type stepping motor is used. However, even if a stepping motor in which a distance between magnetics arranged on a stator and rotor thereof can be changed in accordance with the change in the excited phases is used for reading the original, recording the image and cutting the recording sheet, by changing the current flowing in the windings of the motor in accordance with the change in the excited phases, the holding torque of the motor can be kept constant.

As mentioned above, according to this embodiment, by controlling the value of the current flowing in the windings of the stepping motor in correspondence to the conditions of the phase excitation of the motor, the stepping motor can be smoothly and uniformly rotated whereby the recording sheet and the original can be fed at a constant or even speed.

Further, by applying the above-mentioned sheet feeding apparatus to the facsimile system, the reading of the original and the recording of the image to be reproduced can be performed with high quality. In addition, by applying such sheet feeding apparatus to the driving circuits for driving the sheet cutting motor and the like, the cutting noise of the recording sheet can be reduced.

Furthermore, since the damping amount of the motor is reduced, the noise in the whole sheet feeding apparatus can also be reduced. In addition, since the current control is not executed when the sheet is to be fed at a high speed, but is executed when the sheet is to be fed at a low speed, the feeding error of the sheet can be eliminated and the working speed of the whole apparatus can be increased.

In this way, according to the present invention, by suppressing the fluctuation in the holding torque due to the phase excitation of the motor, the vibration of the stepping motor can be reduced.

Further, by suppressing the fluctuation in the holding torques due to the phase excitation of the stepping motors in the reader and the recorder of the facsimile system, the reading of the original and the recording of the image to be reproduced can be performed with high quality. In addition, according to the present invention, the cutting noise generated in the sheet cutting operation can be reduced.

I claim:
1. A facsimile system comprising:
    an original reading portion for reading an original sheet;
    a recording portion for recording an image on a recording sheet;
    a stepping motor for feeding at least one of the original sheet and the recording sheet;
    a drive means for generating a signal by which said stepping motor is driven repeatedly with alternate first and second excitation modes, said drive means decreasing electric energy sent to said stepping motor in response to a power down signal;
    a control means for outputting a control signal corresponding to a first convey mode which needs a power down of said stepping motor, or a second convey mode which does not need the power down of said stepping motor, in the sheet convey; and
    a power down signal generation means having a judgment means for judging an excitation phase of the stepping motor, said power down signal generation means generating the power down signal when said control means generates the control signal corresponding to the first convey mode and said judgment means judges the two phase excitation mode, but not generating the power down signal even if said judgment means judges the two phase excitation mode when said control means generates the control signal corresponding to the second convey mode;
    wherein said stepping motor is driven by a four phase motor exciting signal, said drive means having a decoder, and wherein said drive means receives said exciting signal and outputs the four phase excitation signal obtained by decoding the excitation signal by means of said decoder.

2. A facsimile system according to claim 1, wherein the first convey mode in said control means is either of the reading operation of original sheet or the image forming operation onto recording sheet, while said second convey mode is an operation other than the reading operation or the image forming operation.

3. A facsimile system according to claim 1, wherein the decreasing of electric energy by said drive means is carried out by decreasing an electric current.

4. A facsimile system according to claim 1, further including:
    a drive control means for outputting said exciting signal to said drive means, said drive control means having an exciting output circuit for outputting said exciting signal, and a counter for a register, said counter outputting pulses to said exciting output circuit by the stepping number indicated by said register.

5. A sheet feeding apparatus comprising:
    a stepping motor for feeding a sheet;
    a drive means for generating a signal by which said stepping motor is driven repeatedly with alternate first and second excitation modes, said drive means decreasing an electric current to be sent to said stepping motor in response to a power down signal;
    a control means for outputting a control signal corresponding to a first convey mode which needs a power down of said stepping motor or a second convey mode which does not need the power down of said stepping motor, in the sheet convey; and
    a power down signal generation means having a judgment means for judging an excitation phase of the stepping motor, said power down signal generation means generating the power down signal when said control means generates the control signal corresponding to the final convey mode and said judgment means judges the two phase excitation mode, but not generating the power down signal even if said judgment means judges the two phase excitation mode when said control means generating the control signal corresponding to the second convey mode.

* * * * *

UNITED STATES PATENT AND TRADEMARK OFFICE
CERTIFICATE OF CORRECTION

PATENT NO. : 5,062,006
DATED : October 29, 1991
INVENTOR(S) : SHIGEO MIURA

It is certified that error appears in the above-identified patent and that said Letters Patent is hereby corrected as shown below:

COLUMN 2

Line 67, "speed i.e.," should read --speed, i.e.,--.

COLUMN 4

Line 19, "motor," should read --motor--.
Line 27, "stopping" should read --stepping--.

COLUMN 6

Line 53, "presense" should read --presence--.

COLUMN 7

Line 11, "and, and" should read --and, when--.

COLUMN 8

Line 18, "if" should be deleted.
Line 33, "nal the" should read --nal, the--.
Line 65, "magnetics" should read --magnets--.

UNITED STATES PATENT AND TRADEMARK OFFICE
CERTIFICATE OF CORRECTION

PATENT NO. : 5,062,006
DATED : October 29, 1991
INVENTOR(S) : SHIGEO MIURA

It is certified that error appears in the above-identified patent and that said Letters Patent is hereby corrected as shown below:

COLUMN 10

Line 57, "generating" should read --generates--.

Signed and Sealed this

First Day of June, 1993

Attest:

MICHAEL K. KIRK

*Attesting Officer*     Acting Commissioner of Patents and Trademarks